United States Patent
Myllymäki et al.

(10) Patent No.: US 7,209,752 B2
(45) Date of Patent: Apr. 24, 2007

(54) ERROR ESTIMATE CONCERNING A TARGET DEVICE'S LOCATION OPERABLE TO MOVE IN A WIRELESS ENVIRONMENT

(75) Inventors: Petri Myllymäki, Helsinki (FI); Petri Kontkanen, Helsinki (FI); Teemu Roos, Helsinki (FI); Kimmo Valtonen, Helsinki (FI); Jussi Lahtinen, Helsinki (FI); Hannes Wettig, Kulloonkylä (FI); Antti Tuominen, Espoo (FI); Henry Tirri, Helsinki (FI)

(73) Assignee: Ekahau Oy, Helsinki (FI)

( * ) Notice: Subject to any disclaimer, the term of this patent is extended or adjusted under 35 U.S.C. 154(b) by 191 days.

(21) Appl. No.: 10/999,220

(22) Filed: Nov. 30, 2004

(65) Prior Publication Data

US 2005/0131635 A1    Jun. 16, 2005

Related U.S. Application Data

(63) Continuation of application No. PCT/FI03/00411, filed on May 27, 2003.

(30) Foreign Application Priority Data

May 31, 2002 (FI) .................................. 20021045

(51) Int. Cl.
    *H04Q 7/20* (2006.01)
(52) U.S. Cl. ................. 455/456.1; 455/456.2; 455/456.5; 455/456.6; 455/457; 701/205
(58) Field of Classification Search ..... 455/456.1–457; 701/205, 217; 382/158
    See application file for complete search history.

(56) References Cited

U.S. PATENT DOCUMENTS 5,293,642 A * 3/1994 Lo ............................ 455/456.2
5,890,068 A   3/1999 Fattouche et al.
6,052,598 A   4/2000 Rudrapatna et al.
6,112,095 A   8/2000 Wax et al.
6,263,208 B1* 7/2001 Chang et al. ............ 455/456.3
6,269,246 B1  7/2001 Rao et al.
6,393,294 B1  5/2002 Perez-Breva et al.
6,782,265 B2  8/2004 Perez-Breva et al.

FOREIGN PATENT DOCUMENTS

| JP | 10-221437 | 8/1998 |
| JP | 2001-313971 A | 11/2001 |
| RU | 2 183 021 C1 | 5/2002 |
| WO | WO 00/69198 | 11/2000 |

* cited by examiner

*Primary Examiner*—Duc Nguyen
*Assistant Examiner*—Justin Lee
(74) *Attorney, Agent, or Firm*—Pillsbury Winthrop Shaw Pittman, LLP

(57) ABSTRACT

A method for determining an error estimate concerning a target device's location. The target device moves and communicates in a wireless environment using signals having at least one measurable signal value. A probabilistic model of the wireless environment indicates a probability distribution for signal values at several sample points in the wireless environment. A set of observations of signal values is made and the target device's location is estimated based on the probabilistic model and the set of observations. The error estimate is determined as a combination of products over several sample points. Each product comprises a probability distribution for the sample point in question being the target device's location and a distance function between the sample point in question and the target device's estimated location.

20 Claims, 6 Drawing Sheets

| x | p(%) |
|---|---|
| 81 | 18 |
| 82 | 15 |
| 83 | 14 |
| 84 | 12 |
| 85 | 10 |
| 86 | 9 |
| 87 | 8 |
| 88 | 5 |
| ... | Σ = 91 |

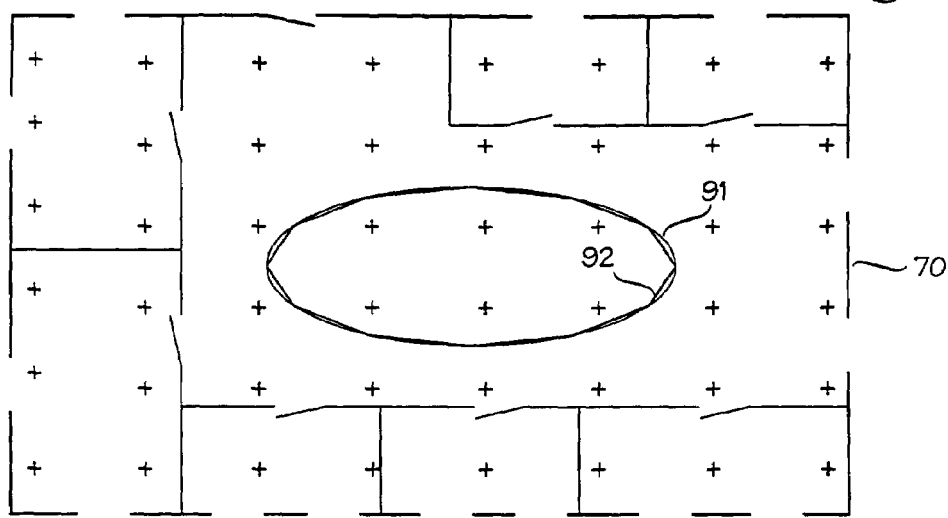
Fig. 9A
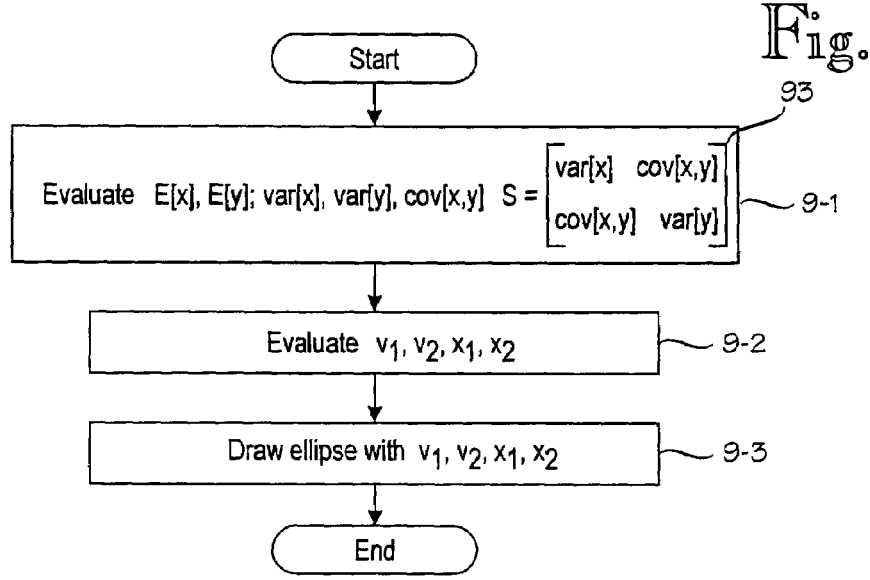
Fig. 9B
```
a := arctan(y_1 / x_1)
for i := 0..k
do
  b := i * 2 * PI / k
  nx := cos(b) * sqrt(v_1)
  ny := sin(b) * sqrt(v_2)
  xs[i] := E[x] + (cos(a) * nx - sin(a) * ny) * r
  ys[i] := E[y] + (sin(a) * nx + cos(a) * ny) * r
loop
```
Fig. 9C

Fig. 10A

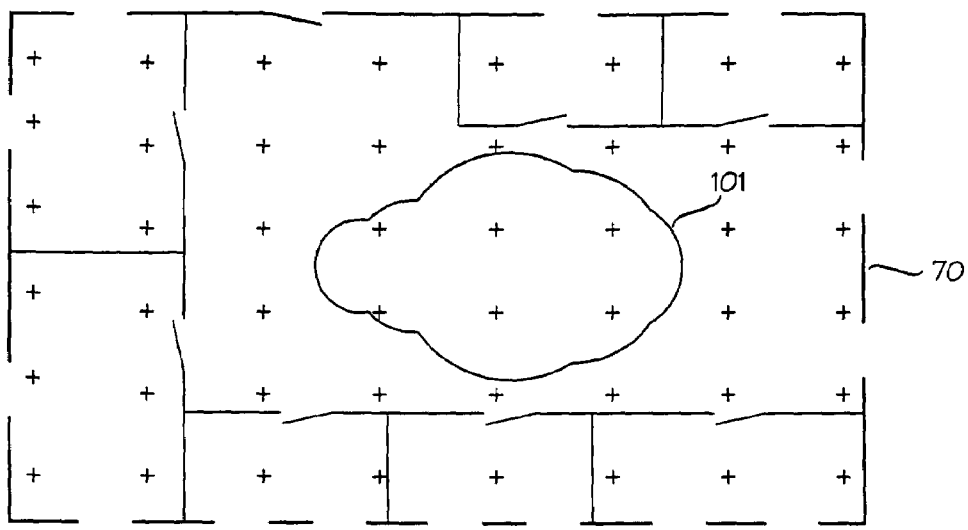

Fig. 10B

```
Start
  ↓
Map C to polar coordinates
  ↓
Transform D to a distribution in the polar coordinate system
  ↓
Find Cartesian coordinates of a region covering m
  ↓
Transform the scaled distances from the origin to Cartesian coordinates
  ↓
End
```

Fig. 10C

```
P = empty set;
foreach c in C
{
    p: polar coordinates of c
    x_delta = c.x - e.x;
    y_delta = c.y - e.y;
    p.distance = sqrt( x_delta ** 2 + y_delta ** 2 );
    p.angle = atan2( y_delta, x_delta );
    add p to P;
}
```

Fig. 10D

```
foreach p in P
{
  %  spread out D in the polar coordinate system
  s1: sector of p
  s2: concentric ring of p
  s1 = int( p.angle / a );
  s2 = int( p.distance / d )
  %  spread a calibration point's mass up to PI / 2 in both directions
  for angle = s1 - int( (p.angle - PI / 2) / a ) to s1 + int( (p.angle + PI / 2) / a )
    {
      i: influence (probability mass) of D[p] at this angle, calculated in
      any desired way, e.g. linear attenuation w.r.t angle difference
      E[s1] += i * s2;
      Dp[s1][s2] += i;
    }
}
```
— 103

```
s: scaling factor
%  find the limits for s
low:  lower limit for s
high:  upper limit for s
cover:  currently covered mass
low    = 0;
cover  = 0;
s      = 1;
while (cover < m)
{
    cover = 0;
    for sector = 0 to int( 2 * PI / a )
    {
        for distance = 0 to int( s * E[sector] )
        {
            cover += Dp[sector][distance];
        }
    }
    if (cover < m)
    {
        low = s;
    }
    else
    {
        high = s;
    }
    s *= m / cover;
}
s = binary_search( low, high, E, Dp );
```
— 104

```
U = empty;
for sector = 0 to int( 2 * PI / a )
{
    u: cartesian coordinates of a blob point
    u.x = e.x + E[sector] * s * cos( sector * a );
    u.y = e.y + E[sector] * s * sin( sector * a );
    add u to U;
}
```
— 105

ERROR ESTIMATE CONCERNING A TARGET DEVICE'S LOCATION OPERABLE TO MOVE IN A WIRELESS ENVIRONMENT

This is a continuation of International Application No. PCT/FI03/00411, filed May 27, 2003, which claims priority from Finnish Application No. 20021045, filed May 31, 2002, the contents of both of which are incorporated herein by reference.

BACKGROUND OF THE INVENTION

The invention relates generally to a positioning technique in which a target device's location is estimated on the basis of one or more observations on the target device's wireless communication environment. FIG. 1 schematically illustrates an example of such a positioning technique. A target device T communicates with base stations BS via a radio interface RI. In this example, the communication is assumed to be radio communication. The target device T observes signal values at the radio interface RI. The observations O are applied to a probabilistic model PM that models the target device's wireless communication environment and produces a location estimate LE. As used herein, a target device is a device whose location is to be determined. The target device communicates via signals in a wireless environment, and signal values in the wireless environment are used for determining the target device's location. For example, the target device may be a data processing device communicating in a wireless local-area network (WLAN), in which case the base stations are usually called access points. The data processing device may be a general-purpose laptop or palmtop computer or a communication device, or it may be a dedicated test or measurement apparatus such as a hospital instrument connected to the WLAN. A location, as used herein, is a coordinate set of one to three coordinates. In some special cases, such as tunnels, a single coordinate may be sufficient but in most cases the location is expressed by a coordinate pair (x, y or angle/radius).

More particularly, the invention relates to a positioning technique that is based on a hidden Markov model. FIG. 2 schematically illustrates a hidden Markov model. The model consists of locations, transitions between the locations and observations made at the locations. In the example shown in FIG. 2, the target device moves along a path of which five locations $q_{t-2}$ through $q_{t+2}$ are shown. More formally, $q_t$ defines the location distribution at time t, so that $P(q_t=s)$ is the probability for the target device being at location s at time t. However, because a location distribution can easily be converted to a single location estimate, the shorthand notation "location q" will be used to refer to a location distribution q.

A signal value, as used herein, is a measurable and location-dependent quantity of a fixed transmitter's signal. For example, signal strength and bit error rate/ratio are examples or measurable and location-dependent quantities.

The word 'hidden' in the hidden Markov model stems from the fact that we are primarily interested in the locations $q_{t-2}$ through $q_{t+2}$ but the locations are not directly observable. Instead we can make a series of observations $o_{t-2}$ through $o_{t+2}$ on the basis of the signal values but there is no simple relationship between the observations $o_{t-2} \ldots o_{t+2}$ and locations $q_{t-2} \ldots q_{t+2}$. (Note that the straight arrows through the locations $q_{t-2}$ through $q_{t+2}$ are not meant to imply that the target devices moves along a straight path or with a constant speed, or that the observations are made at equal intervals.)

A problem underlying the invention derives from the hidden Markov model: we cannot observe a variable that has a monotonous relationship with distance or location. Instead the positioning method is based on observations of signal values. It is possible for two or more remote locations to have near-identical sets of signal values, and a location estimate may be grossly inaccurate. While the benefits of the invention are most prominent in a positioning technique based on a hidden Markov model, the invention is applicable in other positioning techniques.

BRIEF DESCRIPTION OF THE INVENTION

An object of the present invention is to provide a method and an apparatus for implementing the method so as to alleviate the above disadvantages. In other words, the object of the invention is to determine a reliability measure of a positioning technique that is based on a probabilistic model of expected signal values. The object of the invention is achieved by the methods and equipment which are characterized by what is stated in the independent claims. The preferred embodiments of the invention are disclosed in the dependent claims. Some preferred embodiments of the invention relate to novel uses for such a reliability measure.

As used herein, the term probabilistic model refers to a model that indicates a probability distribution of a signal value for several sample points. For each channel or signal value type, such as signal strength, bit error rate/ratio or signal-to-noise ratio, there should be a separate model, or one model may have several layers or components. The expected signal value probability distributions of the sample points, i.e., locations, can be determined by calibration (physical measurements) or by simulations or theoretical calculations, or by any combination of the techniques. New sample points may be obtained by interpolation or extrapolation from other existing sample points.

An aspect of the invention is a method for determining an error estimate for the target device's location as:

$$E(x \mid o) = \sum_l p(l \mid o) \mathrm{dist}(l, x) \qquad [1]$$

wherein:
x=the target device's estimated location;
l=location variable (the "l" stands for location, not the number one);
o=the observation at the observation point (estimated as x);
p (l|o)=probability distribution over the possible values of the location variable l;
dist=some distance function, for example an Euclidean distance, squared distance, or the like.

The above equation 1 applies strictly to a discrete location variable l. If l is continuous, the summing in equation should be replaced by integration:

$$E(x \mid o) = \int_l p(l \mid o) \mathrm{dist}(l, x) \qquad [2]$$

In equation 2, p(l|o) should be interpreted as probability density (instead of distribution).

A real-world interpretation for p(l|o) is the probability of the target device being located at location l. The equations 1 and 2 can be logically combined by saying that the error estimate is determined as a weighted average, that is, a combination of products over the several sample points, wherein each product comprises a probability for the sample point in question being the target device's location; and a distance function between the sample point in question and the target device's estimated location. The 'combination of products' means a sum or integral, depending on whether the model is discrete or continuous, respectively, and in case of a continuous model, the probability distribution should be interpreted as probability density.

According to a preferred embodiment of the invention the error estimate is used to determine new sample points whose signal value probability distribution needs to be determined, or existing sample points that need to be re-determined, for example by recalibration.

Another preferred embodiment of the invention comprises displaying a map showing several sample points and graphically indicating the error estimate at each sample point. Such a map provides a quick visual estimate of the reliability of positioning at various locations.

According to another preferred embodiment of the invention, there is shown, superimposed on a map, an area within which the target device is located with a predetermined probability n, wherein n is a value from, say, 80 to 100%. For instance, the continuous area may be an ellipse. For example, such an area allows a user to see whether there are any nearby danger spots that should be avoided.

According to one preferred embodiment of the invention, the error estimate is used for locating potentially useful candidates for new sample points. The signal value probability distributions are then determined by physical calibration or by calculations based on a propagation model. This embodiment is based on the idea that locations with a high expected future error are promising candidates for new sample points. The future expected error can be calculated from equations 1 or 2 using a tight grid. For example, the grid spacing could be approximately one meter. One or more grid points with a high expected error, or points surrounded by several such grid points, are then used as new sample points.

As the future is unknown, the future expected error can be estimated by summing over all possible future observations:

$$EE(x) = \sum_{o} E(x|o)p(o) \quad [3]$$

for each grid point x, wherein $E(x|o)$ is the expected error from equation 1 (sum) or 2 (integration). If the dimensionality of the observation vector is so high that the summing according to equation 3 is not feasible, the sum can be approximated by sampling. An even simpler approach is to use calibration data as the set over which the sampling is performed, in which case one only needs to sum over the calibrated observations.

To implement the above method, based on equation 3, one needs to determine the probability distribution or density over the future observations. A preferable way to approximate this is as follows. When computing $EE(x)$ from equation 3, the probability distribution or density $p(o)$ is assumed to be the computed probability distribution or density based on past observations made at the sample point closest to the location x. The efficiency of the algorithm can be improved if $E(x|o)$ is approximated by $dist(l^*,x)$, wherein $l^*$ is the point estimate produced by a positioning system after seeing observation o.

BRIEF DESCRIPTION OF THE DRAWINGS

In the following the invention will be described in greater detail by means of preferred embodiments with reference to the attached drawings, in which FIG. 1 schematically illustrates a positioning technique;

FIGS. 9A to 9C illustrate an embodiment for determining an ellipse whose combined probability mass exceeds a given threshold; and FIGS. 10A to 10D illustrate an embodiment for determining an irregularly-shaped area whose combined probability mass exceeds a given threshold.

DETAILED DESCRIPTION OF PREFERRED EMBODIMENTS

Figure 1:
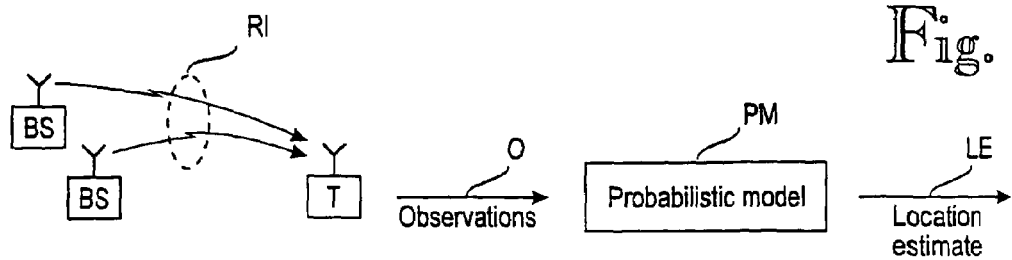
Figure 2:
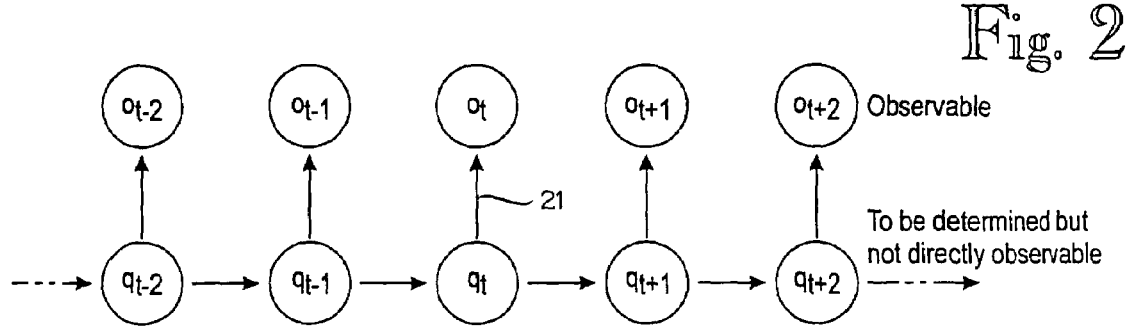
FIG. 2 illustrates a hidden Markov model.

A reference is again made to FIG. 2 that shows a series of signal value observations $o_{t-2}$ through $o_{t+2}$. For each of the observations, there is a respective location $q_{t-2}$ through $q_{t+2}$ along the target device's path. This relationship is shown by arrow 21. The direction of the arrow 21 implies that the location $q_t$ determines the signal values comprised in the observation $o_t$ but the converse is not true. In other words, we can only directly observe the signal values and there is no simple relationship from the observations $o_t$ to the corresponding locations $q_t$. On open sea, a signal value decreases predictably with the distance from the transmitter but in virtually all environments in which the invention will be used, a direct path from the transmitter is frequently blocked, and when it is not, it is not the only path taken by transmissions. Depending on phase, transmissions via multiple paths may combine constructively or destructively. Thus the relationship from location to signal values is far from monotonous, and there are likely to be several locations that share some signal values. Making observations on several channels is one way of reducing uncertainty concerning the target device's location. However, while the prior art positioning techniques estimate a target device's location as the most probable sample point in the probabilistic model, or as a location between the sample points, the prior art positioning techniques based on hidden Markov models provide no estimate of the reliability of the position estimate.

Figure 3:
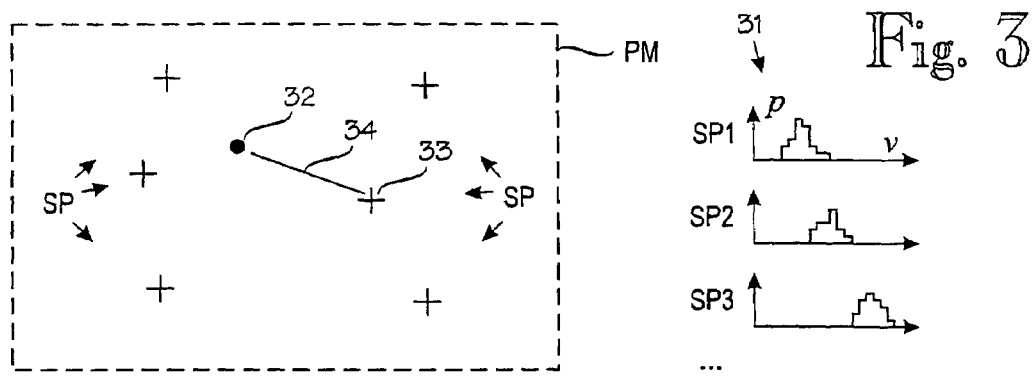
FIG. 3 schematically illustrates a discrete probabilistic model.

FIG. 3 schematically illustrates a discrete probabilistic model PM. The model PM comprises several sample points, generally denoted by reference sign SP. For each of the sample points SP, there is a predetermined (calibrated, calculated or simulated) probability distribution p of signal values v in the target device's wireless environment, typically a radio environment, such as a WLAN or cellular network. Reference numeral 30 generally denotes such probability distributions of signal values, three of which are schematically shown for sample points SP1 through SP3. The target device's estimated location is denoted by reference numeral 32 and is determined on the basis of the probability distribution of signal values at the sample points SP. This much is known from any positioning technique that is based on a probabilistic model of the target device's wireless communication environment. The probability distributions 31 of signal values are independent of the target device's location.

According to the invention, for each of several locations of the probabilistic model PM, such as for each of the sample points SP, there is determined a probability for the target device to be located at that location. Also, a distance function between the estimated location and each of the several locations of the probabilistic model is determined. For instance, one of the sample points is denoted by reference numeral 33. The distance between sample point 33 and the estimated location 32 is denoted by reference numeral 34. A distance function, such as an Euclidean distance, squared distance, or the like, is determined for the distance 34. Thus there are two probability distributions that should not be confused with each other. The first is the probability distribution of signal values at various sample points. This probability distribution is independent of the target device's estimated location. The second probability distribution is the calculated probability for each of various locations to be the target device's location. The locations for which the second probability is calculated can be the sample points SP of the probabilistic model PM, a subset of the sample points, or some other set of locations. For each individual location, the second probability is a single value, but when all the locations are considered, the probabilities constitute a probability distribution (if the location is discrete) or density (if it is continuous).

Figure 4:
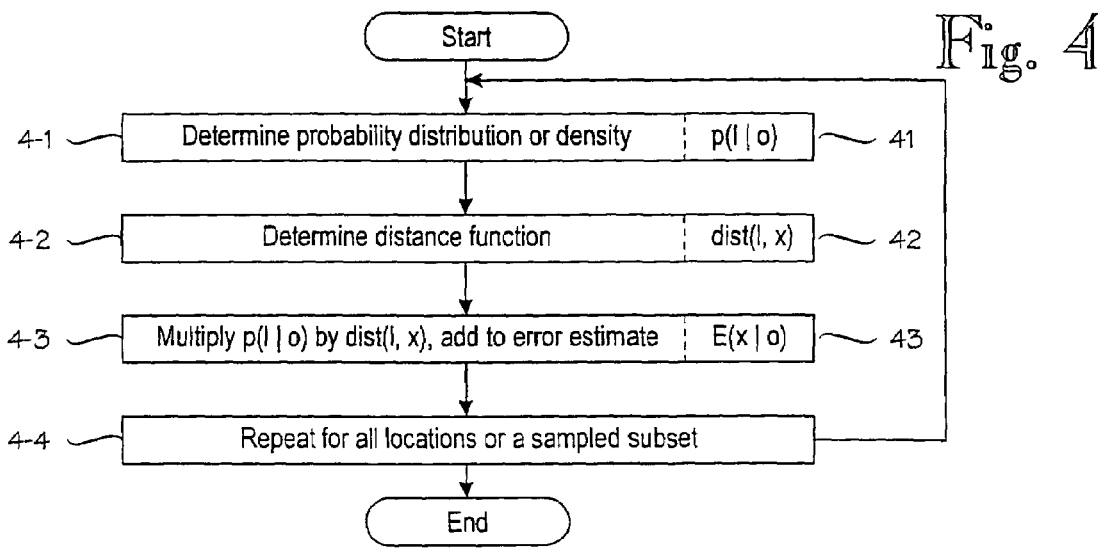
FIG. 4 is a flowchart illustrating the principle of the invention.

FIG. 4 is a flowchart illustrating the principle of the invention. The flowchart of FIG. 4 omits the steps of determining the target device's location on the basis of the probabilistic model and only shows the steps related to error estimation. In step 4-1 the probability distribution or density 41 for the location 32 is determined, to be used in equation 1 or 2. In step 4-2 the distance function 42 for the distance 34 is determined. In step 4-3 the probability distribution or density 41 is multiplied by the distance function 42, and the product is added to the error estimate 43. In step 4—4, the process is repeated (summed or integrated) over the entire location area or a sampled subset of the sample points, depending on available and required computational resources. The location area refers to the physical area where the positioning system is operating.

Figure 5:
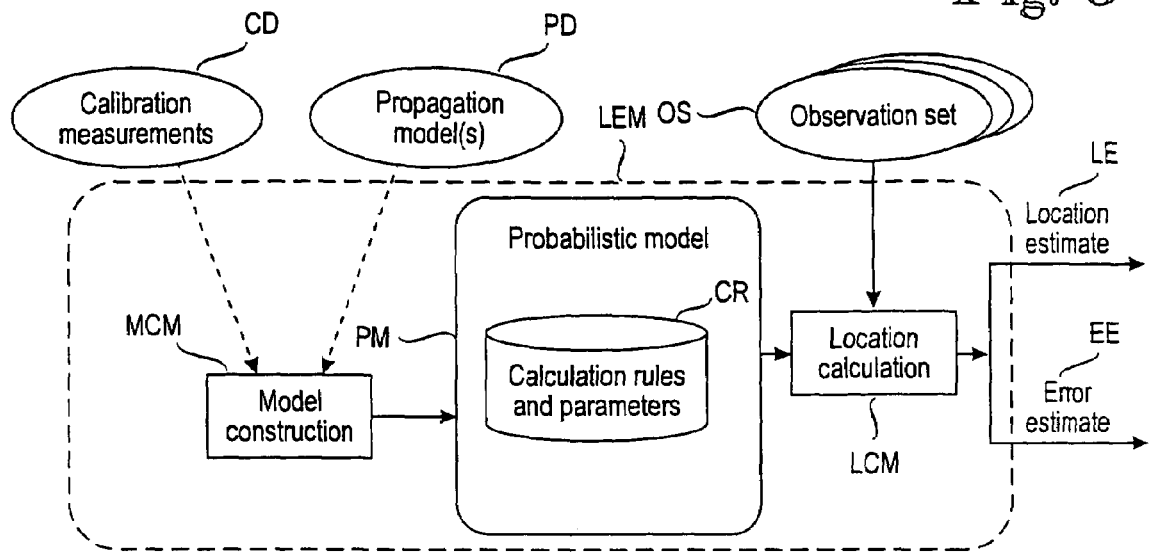
FIG. 5 shows a location estimation module LEM for estimating the target device's location based on signal values at the radio interface RI.

FIG. 5 is a block diagram of an exemplary location estimation module LEM for estimating the target device's location based on signal values at the radio interface RI. FIG. 5 shows a compact location estimation module LEM, but more distributed embodiments are equally possible. An essential feature of the location estimation module is a probabilistic model PM of the target device's wireless environment, the probabilistic model being able to predict the target device's location given a plurality of observations from the radio interface. In this example, the probabilistic model PM is built and maintained by a model construction module MCM. The model construction module MCM builds and maintains the probabilistic model on the basis of calibration data CD or propagation data PD in the form of one or more propagation models, or any combination thereof. Calibration data CD is the result of physically measuring signal values at known locations (or determining the coordinates of those locations if they are not known by other means). Optionally, the calibration data records may also comprise the time at which the measurement was made, in case the signal parameters vary with time. Instead of the calibration data CD, or in addition to them, one or more propagation models PD can be used to model the radio interface RI. The propagation models can be constructed by techniques that are analogous to ray-tracing techniques for visual simulation. The locations at which calibration measurements are collected are called calibration points. The calibration data CD comprises data records each of which comprises the location of the calibration point in question and the set of signal parameters measured at that calibration point. The location can be expressed in any absolute or relative coordinate system. In special cases, such as trains, highways, tunnels, waterways or the like, a single coordinate may be sufficient, but normally two or three co-ordinates will be used.

There is also a location calculation module LCM for producing a location estimate LE on the basis of the target device's observation set OS and the probabilistic model PM. For instance, the location calculation module can be implemented as a software program being executed in a laptop or palmtop computer. Technically, the 'measurements' and 'observations' can be performed similarly, but to avoid confusion, the term 'measurement' is generally used for the calibration measurements, and the signal parameters obtained at the current location of the target device are called 'observations'. The target device's most recent set of observations is called current observations. According to the invention, a location calculation module LCM produces an error estimate EE in addition to the location estimate LE.

Figure 6A:
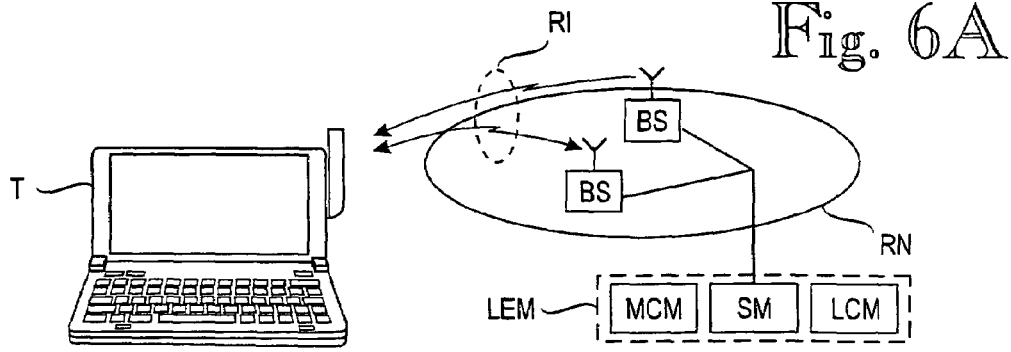
FIGS. 6A and 6B are block diagrams illustrating typical target devices whose location is to be determined.

FIG. 6A is a block diagram illustrating a typical target device T whose location is to be determined. In this example, the target device T is shown as a portable computer that communicates via a radio network RN. For example, the radio network can be WLAN (wireless local-area network) network. In the embodiment shown in FIG. 6A, the location estimation module LEM comprising the probabilistic model PM is not installed in the target device T. As a result, the target device T must send its observation set OS to the location estimation module LEM via one or more of the base station BS it is connected to. The location estimation module LEM returns the target device its location estimate LE via the radio interface RI.

Figure 6B:
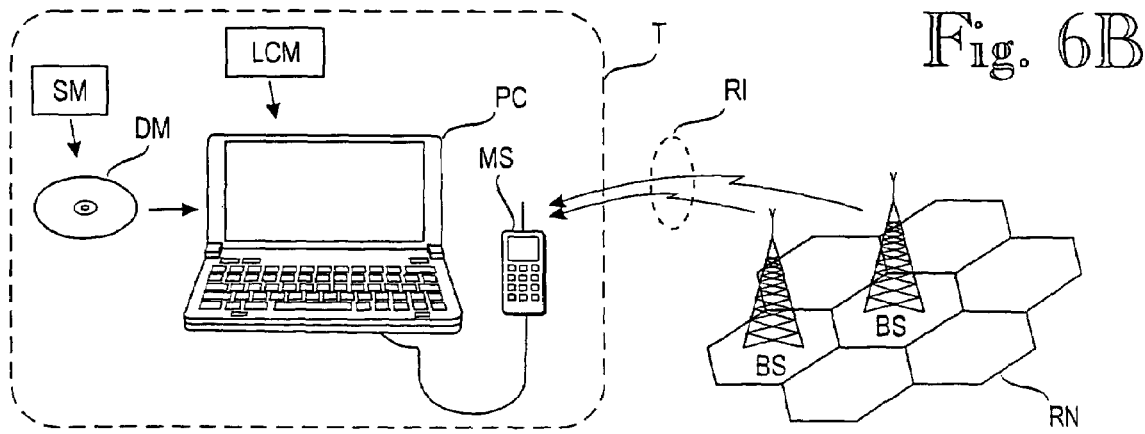

FIG. 6B shows an alternative embodiment in which the target device's attached computer PC receives a copy of the probabilistic model PM on a detachable memory DM, such as a CD-ROM disk, and the target device T is able to determine its own location without transmitting anything. As a yet further alternative (not shown separately), the attached computer PC may receive the probabilistic model via an Internet (or any other data) connection to the location estimation module LEM. Wideband mobile stations can receive the probabilistic model via the radio interface RI. A hybrid of the technologies may also be used such that the receiver receives an initial probabilistic model via a wired connection or on the detachable memory, but later updates to the model are sent via the radio interface.

Two practical applications for the inventive technique of determining an error estimate will be described next. In one application, the error estimate is used as a calibration aid. In another, the error estimate is shown to the user as a visual indicator on the reliability of the position estimate.

Visualization of the Error Estimate

In the following, a location area means the physical area where the positioning system is operating. In the following description, the location area is assumed to be 2-dimensional, but the invention is equally well applicable to 3- or 4-dimensional spaces as well. As stated earlier, the term 'probability distribution' means either a probability distribution or a probability density, depending on the context, that is, whether the domain is discrete or continuous.

The proposed visualization technique consists of two major phases, herein called phase 1 and phase 2. Phase 1 comprises forming a 2-dimensional probability distribution over the whole location area. Phase 1 may be unnecessary if the underlying positioning system is probabilistic. However, some positioning systems may be based on a probability distribution over a limited, small set of locations, for example, over a set of calibration points where sample data has been collected. In this case the discrete probability distribution needs to be expanded over the whole location area. This expansion can be done in several different ways. For instance, the location area may be partitioned into so-called Voronoi subareas so that each subarea consists of one calibration point and all the non-calibration points that are closer to this calibration point than any other calibration point. Alternatively, the expanded probability distribution at location x can be a weighted sum of probabilities at calibration points, where the weights are calculated from the distances. Yet another possibility is to assume a normal distribution around a pointwise location estimate, as will be described in connection with FIGS. 9A to 9C. This can be seen as a special case of a more general technique called "entropification", described in detail in Peter Grünwald's Ph.D. thesis "*The Minimum Description Length and Reasoning under Uncertainty*". Yet another possibility will be described in connection with FIGS. 10A to 10D.

Figure 7:
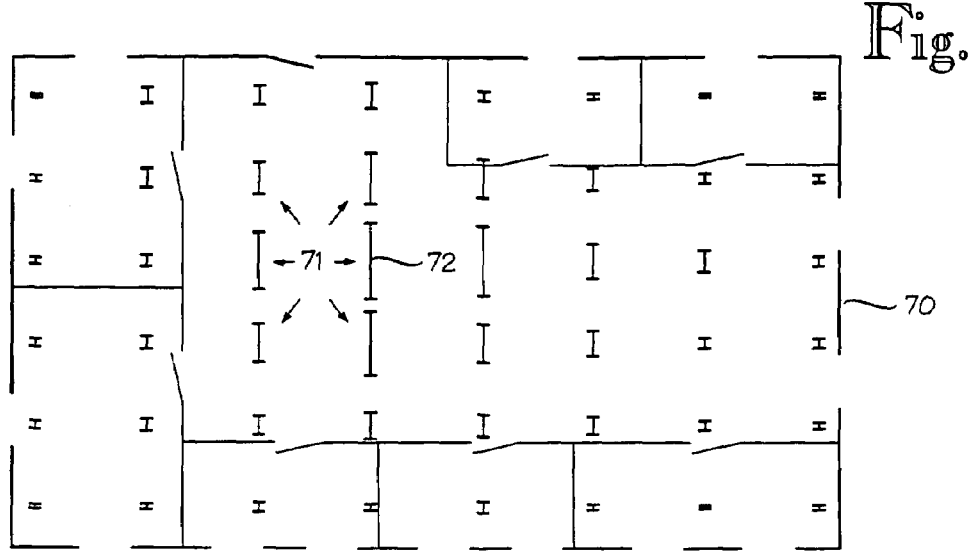
FIG. 7 shows an example of a visualization technique for visualizing the reliability of a position estimate.

Phase 2 comprises visualizing the positioning uncertainty. In this phase, several embodiments are possible. For example, in one visualization embodiment the probability distribution is visualized over the entire location area. The probability value associated to each point in the location area is communicated to the user visually, for example, as a number, colour value, brightness, bar height, circle size, etc. A point in the location area means either a member of a discrete set of alternatives (e.g., the set of calibration points, or the set of pixels on the visual display). The idea is that the user can easily see how the probability mass is distributed in the location area. FIG. 7 shows an example of such a visualization technique. On a map or floor plan 70 there is superimposed a grid of visual indicators, such as bars, commonly denoted by reference numeral 71. One or more visual attributes of the visual indicators 71 indicate the probability of the corresponding grid point being the target device's true location. In this example, the visual attribute is bar length. It is immediately apparent that the target device is most likely located near bar 72 because bar 72 is the longest bar and is the centre point of a concentration of long bars. Instead of bar length, or in addition to it, many more visual attributes can be used.

In another visualization embodiment, the user is shown a nearby area where the user is assumed to be located with a predetermined probability, such as 85, 90 or 95 percent. The predetermined probability is preferably user-selectable. The idea is to determine the smallest area containing a probability mass exceeding the predetermined probability, such as 90%.

Figure 8A:
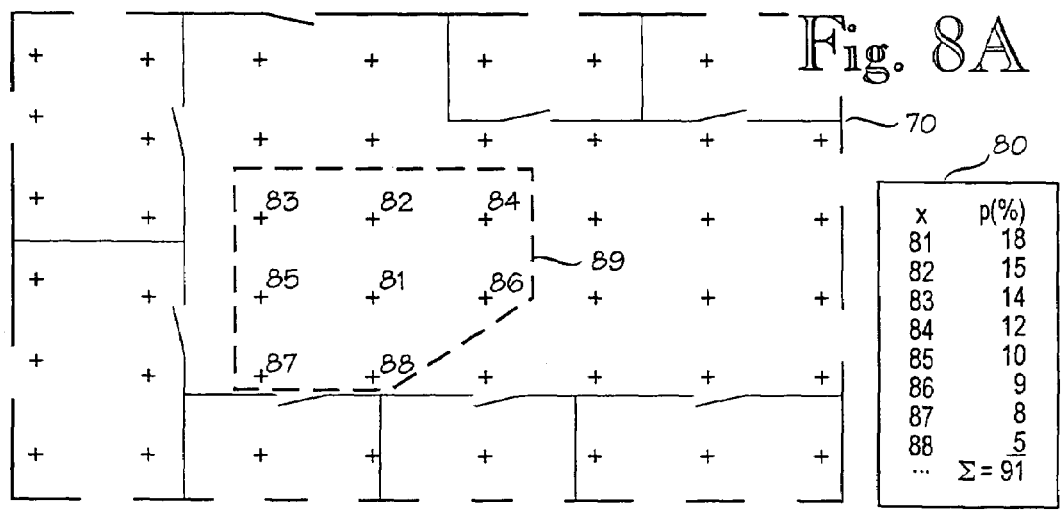
FIGS. 8A and 8B illustrate an embodiment for selecting adjacent points or an area whose combined probability mass for containing the target device's location exceeds a given threshold.
Figure 8B:
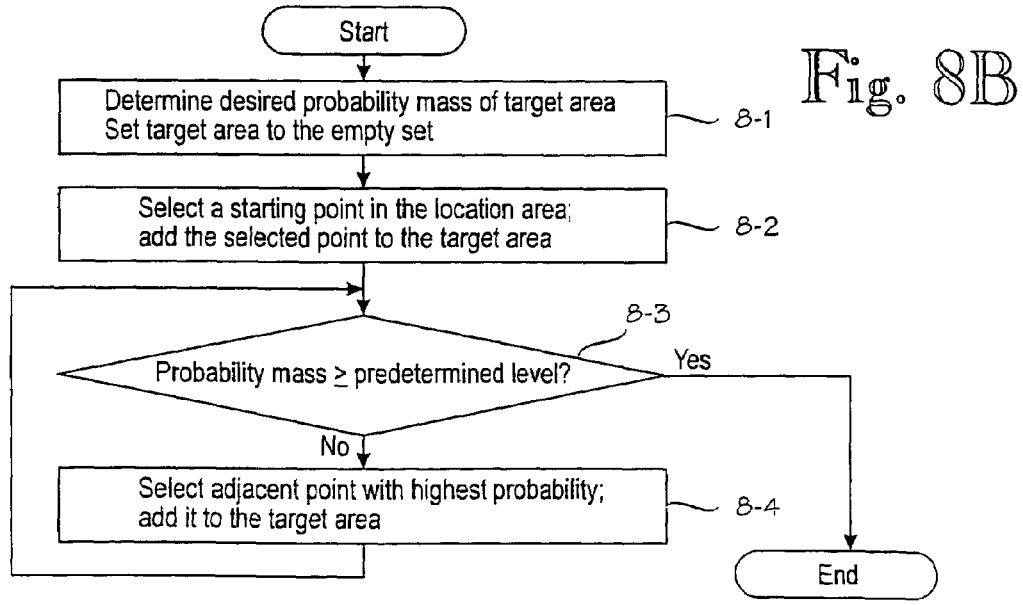

A simple algorithm for determining a continuous area whose combined probability mass exceeds a predetermined probability threshold is shown in FIGS. 8A and 8B. FIG. 8A also shows the map or floor plan 70 shown in FIG. 7. Superimposed on the map 70, there is a grid of grid points, eight of which are denoted by reference numerals 81 to 88. A table 80 indicates the probability p for any of the grid points 81 to 88 being the target device's location. Grid point 81, having a probability of 18 percent, appears to be the most likely location, followed by grid point 82, and so on. Superimposed on the map 70 there is also shown a continuous area 89 whose combined probability mass exceeds a predetermined probability, such as 90%.

An algorithm for determining a target area, such as the area 89, is shown in FIG. 8B. Step 8-1 comprises initialization acts, such as determining the threshold level. For instance, the threshold level may be fixed or user-settable. Next, the target area initialized to the empty set. In step 8-2 a starting point is selected and added to the target area. The starting point may be a random point, but preferably it is a point with a high likelihood of being the target device's location. For instance, the starting point may be the target device's estimated location or the grid point with the highest probability. This example illustrates the latter alternative. Accordingly, the example shown in FIGS. 8A and 8B begins by adding grid point 81, with a probability of 18 percent, to the target area. Next, in step 8-3, it is checked whether the combined probability mass of the target area exceeds (or equals) the predetermined threshold level, such as 90%. If not, the process advances to step 84 in which a point is selected such that the selected point is adjacent to the target area and has the highest probability of points not yet added to the target area. In this example, point 82 with a probability of 15 is selected, after which the process returns to the sufficiency test in step 8-3. In this example, the loop 8-3, 8-4 is repeated until the target area 89 comprises points 81 to 88 with a combined probability mass of 91 percent. If a non-continuous area is searched for, the adjacency requirement in step 8-4 can be relaxed.

To be more precise, the algorithm shown in FIG. 8B does not produce the exact boundary line 89 shown in FIG. 8A but selects the grid points inside the boundary line 89. The set of selected grid points can then be indicated to the user by drawing a suitable boundary line or by indicating the selected grid points in some other way, such as in different colour or brightness.

An improved version of the algorithm shown in FIG. 8B proceeds as follows. The algorithm shown in FIG. 8B is executed by taking any of the most likely grid points as the starting point. Each execution of the algorithm produces (or may produce) a different target area. Finally, the smallest target area is selected and displayed to the user. If this improved algorithm is exhaustive, that is, each grid point is selected as the starting point, and the smallest resulting area is finally selected, the initial choice of starting point is naturally immaterial.

FIGS. 9A to 9C show a visualization embodiment for displaying an ellipse 91, or an approximation of an ellipse, such that the ellipse covers an area with a combined probability mass that equals or exceeds a predetermined threshold level. The term 'approximation of an ellipse' means a polygon 92 whose vertices lie at the perimeter of the ellipse 91. FIG. 9A shows such an ellipse 91 or polygon 92 superimposed on the map 70.

FIG. 9B shows an algorithm for calculating the ellipse. We begin by assuming that there is a pre-calculated probability value p for each grid point being the target device's location. Such a set of probability values was shown as table 80 in FIG. 8A. If the grid point is located at (x, y), the probability for that grid point is p(x, y). The point estimate for the target device is denoted by expected value (E[x], E[y]). The ellipse 91 is based on the covariance matrix of p as follows.

In step 9-1, the following values are determined with respect to p:

the expected values of the x and y coordinates: E[x] and E[y];

the variances of the x and y coordinates: var[x] and var[y];

the covariance cov[x, y];

The covariance matrix of p, mathematically referred to as S, is denoted by reference numeral 93.

In step 9-2 a first eigenvector of S, (x1, y1) and the two eigenvalues v1 and v2 are evaluated as follows:

$$v_1 = \frac{\text{var}[x] + \text{var}[y] + \sqrt{(\text{var}[x] - \text{var}[y])^2 + 4\text{cov}[x, y]^2}}{2} \quad [4]$$

$$v_2 = \frac{\text{var}[x] + \text{var}[y] - \sqrt{(\text{var}[x] - \text{var}[y])^2 + 4\text{cov}[x, y]^2}}{2} \quad [5]$$

$$y_1 = \frac{\text{cov}[x, y]}{v_1 - \text{var}[y]} \quad [6]$$

$$l_1 = \sqrt{1 + y_1^2} \quad [7]$$

$$x_1 = \frac{\sqrt{v_1}}{l_1} \quad [8]$$

$$y_1 = y_1 \cdot \frac{\sqrt{v_1}}{l_1} \quad [9]$$

wherein $l_1$ is a temporary variable.

Finally, in step 9-3, an ellipse is drawn such that (E[x], E[y]) is the centre point of the ellipse, $(x_1, y_1)$ is the major half-axis and $v_1$ and $v_2$ are the lengths of the major and minor half-axis of the ellipse. An exemplary pseudocode listing 94 for drawing an ellipse-like polygon is shown in FIG. 9C. In the listing 94, k is the number of vertices in the polygon to be drawn, r is the radius of the ellipse chosen from the chi$^2$ table, and tables xs and ys contain the coordinates of the vertices. For instance, with k=20 the polygon looks reasonably smooth, and with a value r=2.448 the ellipse contains 95 percent of the probability mass of a Gaussian distribution with the covariance matrix S.

FIGS. 10A to 10D illustrate an algorithm for displaying an irregular target area containing a combined probability mass that equals or exceeds a predetermined threshold. This algorithm uses the following input:
  D: probability distribution over the sample points
  C: data of sample points (Cartesian coordinates)
  e: Cartesian coordinates of point estimate
  Parameters:
  m: probability mass to be covered
  a: angle accuracy
  d: accuracy for distances from origin The output U of the algorithm is a coordinate set of an area depicting the uncertainty about the point estimate.

In step 10-1, the sample point data C is mapped to a polar coordinate system with the origin at the point estimate. For example, if C is two-dimensional, the pseudocode listing shown denoted by reference numeral 102 in FIG. 10C can be used.

In step 10-2, D is transformed to a distribution in the polar coordinate system. For example, the pseudocode listing shown denoted by reference numeral 103 in FIG. 10D can be used. Listing 103 shows an example using an algorithm where angle and distance from the point estimate have been discretized with parameters a and d. E denotes expected distances from the origin for each sector, and Dp denotes two-dimensional distribution in the polar coordinate system.

Step 10-3 comprises finding the Cartesian coordinates of a region covering m. One way of doing this is via the expected distances from the point estimate which define the shape of the region. This shape is then scaled so that it covers m. For example, the pseudocode listing 104 in FIG. 10D can be used, but any suitable search algorithm can be used.

In step 10-4 the scaled distances from the origin are transformed to Cartesian coordinates. For example, the pseudocode listing 105 in FIG. 10D can be used. In listing 105, the somewhat unofficial term 'blob' refers to the irregular target area denoted by reference numeral 101 in FIG. 10A.

Other Applications of the Error Estimate

The above-described embodiments relate to visualizing the error estimate to the end-user. But the error estimate can be used to other purposes, such as aiding calibration. For example, if an error estimate at some location is high, the high expected error can serve as an indication that nearby sample points need recalibration, or that new sample points should be added to the probabilistic model, or that the entire model needs recalibration.

It is readily apparent to a person skilled in the art that, as the technology advances, the inventive concept can be implemented in various ways. The invention and its embodiments are not limited to the examples described above but may vary within the scope of the claims.

The invention claimed is:
1. A method for determining an error estimate concerning a target device's location, wherein the target device is operable to move in a wireless environment and to communicate with the wireless environment using signals each of which has at least one measurable signal value;
  the method comprising:
    maintaining a probabilistic model of the wireless environment, the probabilistic model indicating a probability distribution for signal values at several sample points in the wireless environment;
    making a set of observations of signal values in the wireless environment at the target device's location;
    estimating the target device's location based on the probabilistic model and the set of observations;
    determining the error estimate as a combination of products over several sample points, each product comprising:
      a probability for the sample point in question being the target device's location; and
      a distance function between the sample point in question and the target device's estimated location.
2. A method according to claim 1, further comprising using the error estimate to produce a visual indicator to a user.
3. A method according to claim 2, further comprising superimposing the visual indicator on a map.
4. A method according to claim 3, wherein the visual indicator is a set of discrete indicators, each discrete indicator having at least one location-dependent visual attribute.

5. A method according to claim 3, wherein the visual indicator is a set of locations such that the set comprises the target device's location at least with a predetermined probability.

6. A method according to claim 3, wherein the visual indicator is an area such that the area comprises the target device's location at least with a predetermined probability.

7. A method according to claim 6, further comprising estimating the smallest area that comprises the target device's location at least with the predetermined probability.

8. A method according to claim 7, wherein the smallest area is an ellipse.

9. A method according to claim 7, wherein the smallest area is irregularly-shaped.

10. A method according to claim 1, further comprising using the error estimate in updating the probabilistic model.

11. A method according to claim 10, wherein the updating of the probabilistic model comprises adding new sample points at or near locations where the error estimate is higher than average.

12. A method according to claim 10 or 11, wherein the updating of the probabilistic model comprises re-calibrating existing sample points.

13. A method according to claim 1, further comprising performing the combination of products over several sample points only for a sampled subset of the sample points in the probabilistic model.

14. A location-estimating apparatus for estimating a target device's location, wherein the target device is operable to move in a wireless environment and to communicate with the wireless environment using signals each of which has at least one measurable signal value;

the location-estimating apparatus comprising:
a probabilistic model of the wireless environment, the probabilistic model indicating a probability distribution for signal values at several sample points in the wireless environment;

means for making or receiving a set of observations of signal values in the wireless environment at the target device's location;

means for estimating the target device's location based on the probabilistic model and the set of observations;

means for determining an error estimate of the target device's estimated location as a combination of products over several sample points, each product comprising:
a probability for the sample point in question being the target device's location; and
a distance function between the sample point in question and the target device's estimated location.

15. A location-estimating apparatus according to claim 14, further comprising means for producing a visual indicator of the error estimate.

16. A location-estimating apparatus according to claim 15, further comprising means for superimposing the visual indicator on a map.

17. A location-estimating apparatus according to claim 15, wherein the visual indicator is a set of discrete indicators, each discrete indicator having at least one location-dependent visual attribute.

18. A location-estimating apparatus according to claim 15, wherein the visual indicator is a set of locations such that the set comprises the target device's location at least with a predetermined probability.

19. A location-estimating apparatus according to claim 15, wherein the visual indicator is an area such that the area comprises the target device's location at least with a predetermined probability.

20. A location-estimating apparatus according to claim 15, further comprising means for estimating the smallest area that comprises the target device's location at least with the predetermined probability.

* * * * *